(No Model.)
J. C. BAYLES.
ART OF UNITING METAL PLATES OR SHEETS.
No. 441,276. Patented Nov. 25, 1890.
Fig. 1
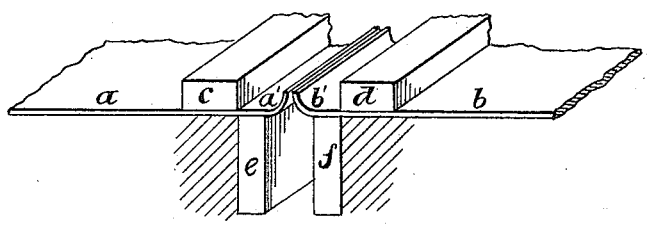
Fig. 2
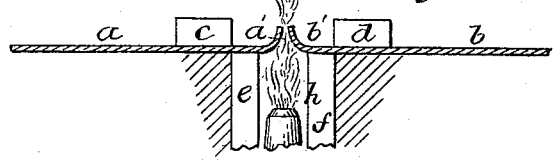
Fig. 3
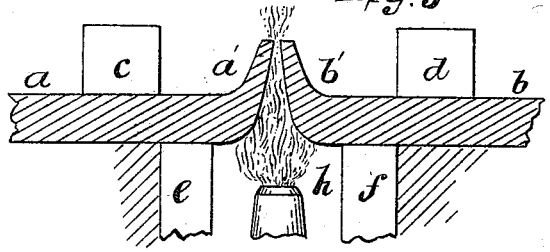
Fig. 4
Fig. 5
Fig. 6
Witnesses
Geo. Wadman
A. M. Jones
Inventor
Jas. C. Bayles
Por Edw. E. Lundy
atty.

UNITED STATES PATENT OFFICE.

JAMES C. BAYLES, OF EAST ORANGE, NEW JERSEY.

ART OF UNITING METAL PLATES OR SHEETS.

SPECIFICATION forming part of Letters Patent No. 441,276, dated November 25, 1890.

Application filed March 6, 1890. Serial No. 342,911. (No model.)

*To all whom it may concern:*

Be it known that I, JAMES C. BAYLES, of East Orange, New Jersey, have invented an Improvement in the Art of Uniting Iron or Steel Plates or Sheets by Welded Seams, of which the following is a specification.

This invention relates to uniting to each other by welded seams iron or steel sheets or plates by the direct application to the meeting faces only of the members of the seam of a heat sufficient to raise to a welding temperature so much of the metal composing such sheets or plates as is to be forced into union without reference to the temperature of the metal elsewhere, and by means of suitably-delivered pressure or hammering forcing the highly-heated meeting faces of the members of the seam into contact, welding them to each other, and forging the seam into its finished shape. In the ordinary processes of welding sheets or plates—as, for example, in the so-called "cross-welding," by which long bands of steel are provided for the manufacture of spirally-welded tubes—the cross-seams have been made by lapping the edges of the strips, then heating them through and through and welding them under a hammer. In lap-welding the sheets are usually held in a horizontal position, with the edge of one overlapping the edge of the other, and heat is applied above and below the lapped portions. Under these conditions the surfaces which are to be united are in close contact with each other and so shielded from the flame that they are heated by conduction only. Hence it is difficult to bring them to a welding temperature without overheating the metal on either side of the seam. It frequently occurs that the surfaces exposed to the flame or to the hot fuel, as the case may be, acquire a condition of semi-fusion before the faces in contact become hot enough to weld together. There results a scaling and warping of the metal on each side of the weld, causing it to present a rough appearance and to exhibit corrugations and inequalities, which have to be subsequently smoothed out by rolling or hammering.

Butt-welding cannot be practically applied to thin sheets of metal, because there is not stock enough in the abutting edges to make a weld, and because the unequal expansion of the thin sheets under the influence of heat render it nearly impossible to bring the two edges into continuous contact along a line of greater length than two or three inches. If pressed together edge to edge by mechanical means, the soft metal on either side of the weld is upset or buckled, as the case may be. These difficulties are avoided and the described distortion of the metal prevented in the present process by the mode of presenting to the source of heat the surfaces which are ultimately to be brought into contact with each other and welded together.

The sheets or plates are prepared for the heating operation by bending or curving the edges which are to be united and then clamping the sheets or plates in suitable juxtaposition, so that their bends will occupy relatively convergent positions.

In practice during the welding operation the work will usually be supported upon the top of an anvil with the two bends extending convergently upward like anticlinal strata. It will of course, however, be understood that the two sheets may be placed in reverse positions with their bends extending downward like synclinal strata, and also that the sheets may occupy vertical or other planes and that in all positions the welding operation can be performed by delivering the pressure or the blows of the hammer against the meeting edges of the bends and toward the face of an anvil which appropriately supports the work or by compressing the work between two rolls bearing transversely across the seam on opposite sides thereof. In view of these considerations the term "clinal welding" has been adopted as the designation of the herein-described mode of welding and the term "clinal weld" as the designation of the result produced thereby. It is immaterial whether the furnace and the anvil are moved along the seam or whether the work is moved over the furnace across the face of the anvil. It is also immaterial whether the hammer employed be wielded by hand or whether it be actuated by mechanism. In any case the effect of the welding and forging operation, whether performed by hammering or rolling, is to force the bends or clinal members of the seam toward the plane of the sheets or plates.

In following a circumferential seam uniting two cylinders end to end the furnace and the welding appliances may be made to travel in a circle around the seam, or they may remain stationary, while the cylinders are made to revolve in such a way as to bring all parts of the seam, successively, first into the required proximity with the source of heat and then within the range of action of the welding appliances. This result is itself new and possesses distinguishing characteristics by which it can be recognized. One of these characteristics, which is manifest upon inspection, is a more or less shallow but peculiarly-shaped groove along the line of the seam on the side of the work opposite that from which the bends originally projected. The peculiarity in the shape of the groove is that its side walls are convex, but meet each other at a sharp angle. Another characteristic, the possession of which greatly contributes to the superiority of the finished work, is discoverable when a polished cross-section of the weld is etched with acid. When so examined, the clinal weld presents an appearance different from that of any of the welds heretofore employed for uniting sheets or plates. Thus a lap-weld or a scarf-weld, when its cross-section is polished and etched with acid, exhibits a well-defined and nearly straight line extending more or less diagonally across the work, which shows the plane of union of the two pieces. Similarly in a butt-weld thus treated and examined a line extending at a right angle across the work indicates the plane of union. On the contrary, in the clinal weld, owing to the forging, which after the union of the metal is primarily effected completes and finishes the seam, there is a considerable flow of metal, which appears to diffuse and break up the line of the weld, and an entire absence of a straight and unbroken line. To such an extent is this the case that it is difficult in examining the etched cross-section of a clinal weld to distinguish between the weld and laminæ of the metal. In the clinal weld nothing resembling a line of weld is distinguishable, whereas the line of the weld is always distinguishable in seams made by lap, scarf, or butt welding. Under the microscope the etched cross-section of the clinal weld exhibits such an interlocking of the laminæ and union of metal with metal as to clearly indicate the superiority of a clinal weld as a means of uniting sheets or plates of metal to each other. In short, the clinal weld produced by the present process is essentially different from that produced by any other process capable of application to iron or steel plates or sheets, and the difference can be detected by mere inspection by reason of the presence of the peculiar groove which has been described, and it can be established by a microscopic examination of an etched cross-section of the clinal weld, which inevitably presents a different appearance from that shown by the etched cross-section of any previously-known form of weld applicable to the union of plates or sheets.

The accompanying illustrative drawings are as follows:

Figure 1 is an isometrical perspective of two iron or steel plates or sheets having the required bends upon their adjacent edges and symbolically representing a furnace and two clamps for clamping the sheets in the required juxtaposition over the furnace-chamber. Fig. 2 is a longitudinal vertical section of the two sheets symbolically representing the furnace and clamps and showing the manner of directing the hot blast into the space between the bends. Fig. 3 is a section similar to Fig. 2, illustrating the manner in which comparatively thick plates are prepared for clinal welding by having their edges scarfed and bent. Fig. 4 is a section illustrating the first effect of hammering in causing the welding together of the bends at their extreme edges. Fig. 5 is a section similar to Fig. 4, illustrating a later stage in the operation of welding and forging. Fig. 6 is a similar section showing the finished shape of the welded seam.

The drawings represent two metallic sheets $a$ and $b$ as being clamped down by the clamps $c$ and $d$ upon the horizontal beds $e$ and $f$ on either side of the furnace-chamber $g$. The curved edges or bends $a'$ and $b'$ of each sheet extend upwardly and toward each other, so that the opening between the bends is narrow at the top and relatively wide at the bottom. The flame or hot blast $h$ is directed upward through the space between the bends, and it hence follows that the bends acquire a welding heat upon their adjacent surfaces without any exposure of their other surfaces to the direct action of the flame or hot blast. As soon as a welding heat has been acquired by the two surfaces of metal upon the opposed sides of the bends the sheets are moved forward out of the furnace and onto an anvil, or the furnace is moved backward and the anvil moved under the bends, as the case may be, and by the blows of a hammer or downward pressure of a roller the heated bends are forced into contact with each other and hammered or pressed down flat upon the anvil beneath them. The width of the bends or curved edges of the sheet and the radius upon which the bends are curved are matters for the exercise of the judgment and experience of the welder and are influenced to some extent by the thickness of the stock to be welded. When brought into position for welding, the extreme edges of the bends are near together, but preferably not in actual contact with each other.

In welding comparatively thick stock—say one-quarter inch or upward in thickness—it may be found advantageous to scarf or gradually reduce the thickness of the edges which are to be united preparatory to forming the bends $a^2$ and $b^2$, as represented in Fig. 3.

For heating the work it is convenient to use a blow-pipe of gas and air so arranged that its flame is delivered into the wider part of the space between the two bends. The furnace and flame may be made to travel along the seam, or the furnace and flame may be stationary and the clamped sheets may be made to move across the furnace. As the furnace recedes or as the sheets emerge from the furnace, the seam is closed by being supported upon an anvil and subjected to the blows of a hammer or to the pressure of a die or to the action of compressing-rolls. A blow or pressure upon the apex of the ridge of hot metal, or what may be called the "clinal seam," forces the highly-heated faces of the bends together, and repeated blows or pressure welds them and practically obliterates any appearance of a seam by the resulting perfect union of the two bends and the forging of the bends into the plane of the sheets. If it be desired that the welded seam shall be of prescribed thickness—as, for example, of the same thickness as the adjacent parts of the plates—care will be exercised to so proportion the width of the bends and the distance from each other at which the sheets are clamped that the bends when pressed or hammered down flat and welded together will make the seam of the desired thickness. A ridge or thickness at the weld does not impair the strength of the seam, and need be avoided only when for any special reason it is desired to make the seam perfectly flush and of the same thickness as that of the adjoining sheets. It will be perceived that the convergence of the bends has the effect of concentrating the heat of the flame upon the faces, which are ultimately to be brought into contact with each other after they have acquired a welding heat. At the same time all other portions of the sheets $a$ and $b$ are shielded from direct contact with the flame. Thus two relatively thin strata of metal upon what are ultimately to become the meeting faces of the bends may be brought to a welding heat, while the adjoining strata on the outer faces of the bends, respectively, remain at a temperature below a welding heat. Under these conditions the welding operation is not interfered with by the variable expansion or buckling which results from the application of great heat to a light stock, and it will consequently be found that this method affords a means of making a smooth and perfectly-welded seam along the abutting edges of the sheets of steel so light that their inevitable warping and distortion when heated otherwise than as herein described renders it impracticable to weld them by the ordinary method. It will also be perceived that the danger of what blacksmiths call "burning" the metal is avoided. This danger exists only when it is found necessary to make one part of the metal too hot in order that another part may be made hot enough for welding. By the method described the hot surfaces are welded as soon as they are hot enough for the purpose, and there is no danger of injury to the metal unless through negligence it is overheated, in which case the meeting faces of the seam will be made much hotter than is needed to enable them to be welded.

This invention is applicable to welding seams in all constructions of sheet or plate iron or steel, and may be economically and usefully employed in welding the seams of boiler-shells, large tubes, cylindrical tanks, or any other objects composed of sheets of steel or iron requiring to be joined together edgewise or end to end.

It is to be remarked that although the heating for the purpose of welding is done by the flame which is forced between the convergent under sides or meeting faces of the bends it may under some circumstances be desirable to also apply heat from above. Thus in working thick stock it may be necessary to apply heat from above in order to hasten the heating of the metal exterior to the seam, which must yield and change shape under the hammer or roll in order that the welding-faces may be brought together when the forcible compression of the clinal axis of the seam necessitates a redisposition of the metal in the bends constituting the members of the seam. Heat applied exterior to the seam has no function in promoting welding; but as iron or steel works more easily under the hammer when hot than when cold it is advantageous to heat both sides of thick stock when flush welds are desired.

It will be found upon trial that a welded seam made in the manner described will have the same coefficient of strength as the stock outside the seam, even if the seam be hammered down so that is no thicker than the original stock. It will also be found that the stock on either side of the weld will not be impaired in strength, as it generally is when two sheets are united by the ordinary process of lap-welding, because in the present process it is unnecessary to raise any part of the metal under manipulation above the temperature needed for welding, at which temperature the metal is not impaired.

What is claimed as the invention is—

1. The process of welding seams in iron or steel plates or sheets herein described, which consists in bringing to the welding heat the opposed faces of the two converging bends formed upon the juxtaposed edges of the sheets which are to be united without reference to the temperature of the metal elsewhere than at the said faces and in uniting the plates or sheets thus locally heated by hammer blows or pressure applied along the clinal axis of the seam.

2. The herein-described process of welding seams of iron or steel plates or sheets, which consists in arranging the members of the seam in oppositely-inclined positions with their extreme edges near together, in then directing a hot blast or flame into and through the space between the oppositely-inclined members of the seam and thereby heating to a welding heat the surfaces to be forced into union without reference to the temperature of any other portions of the sheets or plates, and in then immediately forcing the said highly-heated surfaces into contact and welding them together by suitably-administered compression or hammering, as set forth.

3. The herein-described process of uniting sheets of iron or steel to each other by welded seams, which consists in curving or bending the edges of two plates into diagonal bends of suitable width to form the members of the seam, then clamping the two sheets in the same plane in such relation that their bends converge toward and nearly meet each other, then directing a hot blast or flame transversely into the wider part of the space between the bends until the metal upon the opposed surfaces, of the bends, respectively has acquired a welding heat, and in then compressing or hammering the bends and thereby forcing the highly-heated surfaces of the bends into contact with each other and welding them together and forging the clinal seam thus formed into its finished shape.

4. The improvement in the art of uniting the edges of iron or steel plates or sheets, which consists in uniting them by means of the clinal weld herein described.

JAMES C. BAYLES.

Witnesses:
A. M. JONES,
WM. E. QUIMBY.